United States Patent [19]

Wenzel et al.

[11] 4,401,786

[45] Aug. 30, 1983

[54] USE OF WATER SOLUBLE ELECTROLYTES AS ADDITIVES IN AQUEOUS DISPERSIONS OF SYNTHETIC MATERIALS AND AN AQUEOUS DISPERSION OF SYNTHETIC MATERIALS CONTAINING A WATER SOLUBLE ELECTROLYTE

[75] Inventors: Wolfgang Wenzel, Bergisch-Gladbach; Walter Meckel, Neuss, both of Fed. Rep. of Germany

[73] Assignee: Bayer Aktiengesellschaft, Leverkusen, Fed. Rep. of Germany

[21] Appl. No.: 110,021

[22] Filed: Jan. 7, 1980

[30] Foreign Application Priority Data

Jan. 9, 1979 [DE] Fed. Rep. of Germany ....... 2900574

[51] Int. Cl.$^3$ .............................................. C08L 75/06
[52] U.S. Cl. ................................... 524/591; 524/398; 524/401; 524/423; 524/429; 524/552; 524/556; 524/560; 524/566; 524/575
[58] Field of Search ................. 260/29.6 T, 29.2 TN, 260/29.6 M; 525/4; 524/423, 591, 398, 401, 429

[56] References Cited

U.S. PATENT DOCUMENTS

| | | | |
|---|---|---|---|
| 2,928,759 | 3/1960 | Newberg et al. | 524/417 |
| 3,049,500 | 8/1962 | Howland et al. | 524/417 |
| 3,409,578 | 11/1968 | Hwa | 524/398 |
| 3,479,310 | 11/1969 | Dieterich et al. | 260/29.2 |
| 3,644,233 | 2/1972 | Traubel et al. | 525/4 |
| 3,756,992 | 9/1973 | Dieterich | 260/77.5 Q |
| 3,830,770 | 8/1974 | Ribbans | 260/29.6 F |
| 3,905,929 | 9/1975 | Noll | 260/29.2 TN |
| 3,920,598 | 11/1975 | Reiff et al. | 260/29.2 TN |
| 3,943,158 | 3/1976 | Dieterich et al. | 260/453 A |
| 3,959,329 | 5/1976 | Dieterich et al. | 260/29.2 TN |
| 4,092,286 | 5/1978 | Noll et al. | 260/29.2 TN |
| 4,094,842 | 6/1978 | Wenzel et al. | 260/29.2 TN |
| 4,108,814 | 8/1978 | Reiff et al. | 260/29.2 TN |
| 4,293,474 | 10/1981 | Dieterich et al. | 260/29.2 TN |

FOREIGN PATENT DOCUMENTS

| | | |
|---|---|---|
| 2424331 | 10/1975 | Fed. Rep. of Germany . |
| 2659617 | 6/1978 | Fed. Rep. of Germany ..... 260/29.2 TN |
| 2708442 | 8/1978 | Fed. Rep. of Germany . |
| 1076688 | 7/1967 | United Kingdom . |
| 1516018 | 6/1978 | United Kingdom . |

*Primary Examiner*—Theodore E. Pertilla
*Attorney, Agent, or Firm*—Gene Harsh; Lawrence S. Pope; Thomas W. Roy

[57] ABSTRACT

The present invention relates to the use of soluble electrolytes as additive to aqueous dispersions of self-dispersible anionically and/or nonionically hydrophilically modified synthetic materials for the purpose of improving the water resistance and/or blocking resistance of sheet products produced from the dispersions.

8 Claims, No Drawings

USE OF WATER SOLUBLE ELECTROLYTES AS ADDITIVES IN AQUEOUS DISPERSIONS OF SYNTHETIC MATERIALS AND AN AQUEOUS DISPERSION OF SYNTHETIC MATERIALS CONTAINING A WATER SOLUBLE ELECTROLYTE

This invention relates to the use of water soluble electrolytes for improving the properties of aqueous dispersions of synthetic materials and improving the sheet products obtainable from these dispersions, and to a preferred dispersion containing a water soluble electrolyte.

The preparation of stable i.e. non-sedimenting, aqueous dispersions of synthetic materials, in particular polyurethane dispersions, has long been known and has been described, for example in U.S. Pat. No. 3,479,310; British Pat. No. 1,076,688; U.S. Pat. No. 3,756,992; U.S. Pat. No. 4,094,842; U.S. Pat. No. 4,108,814; German Offenlegungsschrift No. 2,035m732; German Offenlegungsschrift No. 2,659,617; German Offenlegungsschrift No. 2,708,442; U.S. Pat. No. 3,905,929; U.S. Pat. No. 3,920,598; German Offenlegungsschrift No. 2,555,534; and "Die Angewandte Makro-molekulare Chemie" 26, 85–106 (1972) and Angewandte Chemie 82, 53–63 (1970). In some publications, it is also indicated that metal ions may be added to the polyurethane dispersions; thus British Pat. No. 1,076,688, for example, describes inter alia the addition of oxides, hydroxides or carbonates of divalent and higher polyvalent metals to dispersions which must contain free acid groups because these sparingly water soluble compounds would otherwise be incapable of reacting with the polyurethane matrix. German Offenlegungsschrift No. 2,659,617, on the other hand, describes the addition of from 0.5 to 100% by weight of electrolyte based on the solids content, to aqueous ionic polyurethane dispersions in which the polyurethane ionomers must contain from 1.2 to 50% by weight, based on the polyurethane solids content, of ethylene oxide units, in order to prevent coagulation. The problem to be solved by the invention disclosed in the said prior publication was to be able to adjust the coagulation temperature of aqueous polyurethane (urea) dispersions by the addition of electrolytes.

The object of the present invention, on the other hand, was to modify aqueous dispersions of synthetic materials so that sheet products produced from them would have improved resistance to water and/or to blocking.

This object could surprisingly be achieved according to the invention by incorporating certain quantities of electrolytes defined in more detail below to the dispersions of synthetic materials described below. It was also surprising to find that aqueous dispersions of anionically hydrophylically modified synthetic materials were not deleteriously affected in their stability in storage by the modification according to the invention.

The present invention relates to the use of water soluble electrolytes as additives to aqueous dispersions of self-dispersible anionically and/or non-ionically hydrophilically modified synthetic materials or to aqueous dispersions of synthetic materials containing external emulsifiers with the object of improving the water resistance and/or blocking resistance of the sheet products produced from these dispersions, the quantity of additives being from 0.01 to 3% by weight, based on the solids content, in the case of synthetic materials containing not more than 1.0% by weight of chemically fixed non-ionic hydrophilic groups and from 0.01 to 0.4% by weight, based on the solids content, in the case of synthetic materials containing more than 1.0% by weight of chemically fixed non-ionic hydrophilic groups.

The present invention also relates to the aqueous dispersions of a polyurethane containing chemically fixed anionic groups obtainable by means of the invention, said dispersions having a solids content of from 5 to 65% by weight and containing from 1 to 50 milli-equivalents of chemically fixed anionic groups per 100 g and not more than 1.0% by weight of ethylene oxide units chemically fixed within polyether chains, which contain from 0.01 to 3.0% by weight, based on the solids content, of water soluble electrolyte.

Any aqueous dispersions of synthetic materials are suitable for the modification according to the invention in particular polyurethanes, with the exclusion of electrolyte sensitive, cationically hydrophilically modified self-dispersible materials. This means that both aqueous dispersions of synthetic materials which are hydrophobic on their own but contain emulsifiers and aqueous dispersions of self-dispersible synthetic materials, i.e. materials which contain chemically fixed hydrophilic groups, are suitable for the modification according to the invention.

Suitable dispersions include, for example, polymer dispersions such as those based on natural or synthetic rubber, styrene-butadiene copolymers, polymers of 2-chlorobutadiene, styrene-acrylonitrile copolymers, polyethylene, chlorosulphonate or chlorinated polyethylene, butadiene-acrylonitrile copolymers, butadiene-methacrylate copolymers, polyacrylic acid esters, PVC and unsaponified or optionally partially saponified copolymers of ethylene and vinyl acetate.

These copolymer dispersions may be either dispersions containing external emulsifiers or they may be dispersions of self-dispersible copolymers, and this capacity for self-dispersion may be produced either by ionic groups, in particular carboxylate or sulphonate groups, or by non-ionic-hydrophilic groups, e.g. ethylene oxide groups.

The dispersions modified according to the invention are preferably aqueous polyurethane dispersions. Suitable aqueous polyurethane dispersions include in particular aqueous dispersions of self-dispersible, anionically modified polyurethanes which contain not more than 1% by weight, based on the solid content, of ethylene oxide units, i.e. non-ionic-hydrophilic groups, built into the polyether chain. These latter particularly preferred dispersions generally contain from 1 to 50 milli-equivalents, preferably from 5 to 30 milli-equivalents, per 100 g of solids content, of anionic groups, i.e. in particular carboxylate groups $COO^-$ or sulphonate groups $SO_3^-$. Dispersions containing more than 1.0% by weight of ethylene oxide units built into the polyether chain can also be modified according to the invention but the procedure according to the invention in this case has the effect not so much of improving the water resistance but rather of improving the blocking resistance of coatings produced from the dispersions.

Any polyurethane dispersions known in the art such as those disclosed, for example, in the literature references cited above are suitable for the invention provided they satisfy the above criteria.

The dispersions to be modified according to the invention generally have solids contents of from 5 to 65% by weight, preferably from 20 to 50% by weight.

Mixtures of the dispersions exemplified above may, of course, also be modified according to the invention.

The electrolytes used according to the invention include water soluble organic or inorganic salts. The cations may be any metal cations and organic or inorganic compounds containing

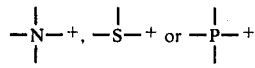

groups. Metal ions carrying two positive charges are preferred, and among these the cations of alkaline earth metals are particularly preferred.

The acid components of the salts may be any organic or inorganic acids, provided that the salts obtained from them are water soluble. Mineral acids such as sulphuric acid, nitric acid, phosphoric acid and hydrochloric acid are preferably used.

The following are examples of preferred salts, which are partly hydrated: calcium chloride, calcium nitrate, magnesium acetate, magnesium chloride, magnesium nitrate, copper formate, manganese acetate, manganese chloride, barium chloride and cadmium sulphate.

In the use according to the invention, the electrolytes are used in a quantity of from 0.01 to 3.0% by weight, preferably from 0.05 to 0.5% by weight, based on the dispersed solids substance, with the proviso that when the dispersions of synthetic materials which are to be modified according to the invention contain more than 1.0% by weight of ethylene oxide units chemically fixed in polyether chains, the electrolytes should only be used in a quantity of from 0.01 to 0.4% by weight, preferably from 0.05 to 0.4% by weight, based on the solids content. The addition of electrolytes to the dispersions produces a substantial improvement in the water resistance of sheet products obtained from the dispersions, particularly in the case of dispersions of anionically modified self-dispersible synthetic materials, especially polyurethanes. When modifying dispersions of non-ionically hydrophilically modified materials, the improvement in the water resistance is of comparatively minor importance but even here the procedure according to the invention produces a very substantial improvement in the blocking resistance of sheet products obtained from the dispersions.

In the use according to the invention, the dispersion of synthetic material which is to be modified according to the invention is preferably introduced into a reaction vessel equipped with a stirrer or other mixing apparatus and the electrolyte solution is introduced at a temperature from 5° to 95° C., preferably from 15° to 35° C., with vigorous mixing.

The electrolyte solution preferably contains salt and water in a proportion by weight in the range of from 1:1 to 1:200, most preferably from 1:5 to 1:30.

The quantity of salt added depended on the dispersions to be modified and in the case of anionic dispersions the quantity of electrolyte added should be not more than satisfies the following equation: Σ Mol (potential) anions of the dispersions ≧ Σ Val cation of added electrolytes. This means that the cation content should be not more than the combined potential and actual anion content of the polyurethane.

Preparation of the electrolytes in situ by the separate addition, first of an aqueous alkaline solution and then of the appropriate acid to the aqueous dispersions is in principle possible but is not preferred.

The polyurethane (urea) dispersions which are modified according to the invention may, of course, also be mixed with other polymer dispersions, provided that the dispersions are compatible with each other.

As already mentioned, the use according to the invention makes it possible for polyurethane (urea) dispersions to be prepared which result in films which are distinguished by their high water resistance and/or blocking resistance.

Dispersions modified according to the invention may in principle be used for the same purposes as the unmodified dispersions used as starting materials, for example as flexible homogeneous or cellular or microporous coatings for paper, textiles or natural and synthetic leather or as adhesives or impregnating agents or as less flexible or non-flexible coatings such as lacquers for wood, metals or synthetic materials or as size for glass fibres or for enveloping pigment particles. The dispersions are, in all cases, applied from the aqueous phase, the techniques employed depending on the intended use; for example, they may be applied by doctor coating, spread coating Spraying, brush coating or printing, and the water should be removed after application.

In the examples which follow, all percentages are percentages by weight unless otherwise indicated.

EXAMPLE 1

300 g butanediol phthalate (hydroxyl number 56) (PE)
60 g isophorone diisocyanate (IPDI)
570 g acetone
20 g ethylene diamino ethane sulphonic acid sodium (45% in water) (AAS)
545 g salt-free water
3 ml calcium nitrate (solution) (1 N in water)

Method

The polyester (PE) is dehydrated under vacuum at 120° C. with stirring for 30 minutes. The ester is then cooled to 80° C. and the diisocyanate is added. The melt is stirred at 80° to 90° C. until it is found to have an isocyanate content of 2.7%. Acetone is then slowly added, the temperature falling to about 45° C. as a result of this addition. When the AAS solution becomes clear, it is diluted with 60 g of water and stirred for 5 minutes. The remainder of the water is then added to produce a dispersion and the acetone is evaporated off in a water jet vacuum. The dispersion obtained in this way will hereinafter be referred to as dispersion (a). The calcium nitrate solution is added to 380 g of this dispersion. The modified dispersion (b) according to the invention is thus obtained. Both dispersions (a) and (b) have a solids content of 40.5%, a Ford cup outflow time (4 mm nozzle) of 15 seconds and a pH of 6.8.

Both the original dispersion (a) and the modified dispersion (b) are drawn out on a glass plate to form a film in each case and dried at 120° C. for 30 minutes.

The following wet abrasion values according to Satra (see Table 1) were found:
(a) 506
(b) 1411.

EXAMPLE 2

100.0 g of a polyester of adipic acid, phthalic acid and ethylene glycol (hydroxyl number 56)
300.0 g of a polyester of phthalic acid and butanediol (hydroxyl number 56)
79.0 g of isophorone diisocyanate
850.0 g of acetone
39.0 g of ethylene diamino ethane sulphonic acid sodium (45% in water)
720.0 g salt-free water.

Method: See Example 1

A sedimentation resistance dispersion (a) having a solids content of 41.2%, a Ford cup outflow time (4 mm nozzle) of 19 seconds and a pH of 6.6 is obtained.

To portions of this dispersion (a) each weighing 25 g there are added (b) 0.1 ml, (c) 0.2 ml, (d) 0.3 ml, (e) 0.4 ml and (f) 0.5 ml of a 1 N calcium nitrate solution with vigorous stirring (to prevent coagulation). From each of the dispersions (a) to (f) two films are drawn on glass plates and dried for 30 minutes at 120° C. The properties of the films are summarised in Table 1.

Even dispersion (b) has a substantially higher blocking resistance as paper coating compound than dispersion (a).

TABLE 1

| Dispersion | ml of 1 N Ca $(NO_3)_2$ per 25 g of dispersion | Wet Abrasion according to Satra[1] |
|---|---|---|
| a | — | 1552 |
| $a_1$ | — | 1575 |
| b | 0.1 | 1661 |
| $b_1$ | 0.1 | 1622 |
| c | 0.2 | 1824 |
| $c_1$ | 0.2 | 1856 |
| d | 0.3 | 3566 |
| $d_1$ | 0.3 | 3646 |
| e | 0.4 | 4580 |
| $e_1$ | 0.4 | 4560 |
| f | 0.5 | 5129 |

[1]The wet abrasions were carried out with a wet felt on films drawn on glass plates, using a Satra finish rub fastness tester STM 102 under a load of 2.5 kg and at about 150 revs/min.

EXAMPLE 3

250.0 g of a polypropylene glycol polyether started on bisphenol A (hydroxyl number 197)
117.9 g hexamethylene diisocyanate
475.0 g of acetone
30.8 g of ethylene diamine-2-ethane sulphonic acid sodium (45% in water)
6.7 g of ethylene diamine
560.0 g of salt-free water Method The polyether is dehydrated in a vacuum at 110° C. with stirring for 30 minutes and cooled to 800° C. The diisocyanate is added and the mixture stirred at 80° C. until it is found to have an isocyanate content of 5.4% (about 6 hours). The acetone is then stirred in. When a homogeneous solution is obtained, a mixture of the two amines and 20 ml of water is stirred in for 5 minutes at 60° C. The remainder of the water is then added to form a dispersion and the acetone is distilled off.

A finely divided dispersion which shows a Tyndall effect in transmitted light is obtained. The pH is 6. The Ford cup viscosity (4 mm nozzle) at a solids content of 41% is 120 seconds. The wet abrasions of the films are summarised in Table 2 in relation to the electrolyte content.

TABLE 2

| Dispersion g | Nature of electrolyte | 1 N solution ml | Wet abrasions according to Satra |
|---|---|---|---|
| 25 | — | — | 370 |
| 25 | Cu(II)formate | 0.1 | 520 |
| 25 | " | 0.1 | 596 |
| 25 | " | 0.2 | 693 |
| 25 | " | 0.2 | 732 |
| 25 | " | 0.3 | 946 |
| 25 | " | 0.3 | 933 |
| 25 | " | 0.4 | 766 |
| 25 | " | 0.4 | 717 |

EXAMPLE 4

An aqueous polymer dispersion having a solids content of 45% (prepared from butyl acrylate and 3% of acrylic acid and of methacrylic acid) and containing 0.8% by weight, based on the solids content, of ethoxylated nonylphenol (molecular weight 1530) and adjusted to pH 8.5 with aqueous ammonia was divided into seperate portions of 25 g each and to these portions were added differing quantities of 1 N sodium chloride solution together with 10 ml of water in each case. The films drawn on glass plates were dried for 30 minutes at 120° C. The wet abrasion values are summarised in Table 3.

TABLE 3

| Dispersion | | ml 1 N NaCl per 25 g of dispersion | Ml $H_2O$ added | wet abrasions according to Satra |
|---|---|---|---|---|
| a | (parallel) | — | 10 | 394 |
| $a_1$ | experiment) | — | 10 | 432 |
| b | | 0.1 | 10 | 1422 |
| c | | 0.2 | 10 | 1992 |
| d | | 0.4 | 10 | 2432 |

EXAMPLE 5

Differing quantities of 1 N sodium chloride solution together with 10 ml of water are added to seperate portions weighing 25 g each of an aqueous polymer dispersion having a solids content of 50% (synthesized from styrene, acrylonitrile and 6% by weight of methacrylic acid) and containing 0.75% by weight of ethoxylated nonylphenol (molecular weight 1530) and adjusted to pH 8 with aqueous ammonia. The films drawn on glass plates are dried at 120° C. for 30 minutes. The wet abrasion characteristics are summarised in Table 4.

TABLE 4

| Dispersion | ml of 1 N NaCl per 25 g of dispersions | ml $H_2O$ added | wet abrasion according to Satra |
|---|---|---|---|
| $a_1$ | — | 10 | 610 |
| $a_2$ | — | 10 | 606 |
| $b_1$ | 0.1 | 10 | 1909 |
| $b_2$ | 0.1 | 10 | 1932 |
| $c_1$ | 0.2 | 10 | 2089 |
| $c_2$ | 0.2 | 10 | 2137 |
| $d_1$ | 0.3 | 10 | 2976 |

We claim:

1. A stable aqueous dispersion of a polyurethane which yields films having superior water resistance and/or blocking resistance having chemically fixed anionic groups amounting to 1 to 50 milliequivalents per 100 g and not more than 1.0% by weight of ethylene oxide units chemically fixed within polyester chains, which dispersion has a solids content of from 5 to 65% by weight, characterized by containing 0.01 to 3.0% by weight, based on the solids content, of a water soluble organic or inorganic salt other than an external emulsifier.

2. A process for improving stable aqueous polyurethane dispersions so that films prepared from these dispersions display superior blocking resistance and/or water resistance comprising incorporating a water soluble organic or inorganic salt other than an external emulsifier into the dispersion medium as follows:
 (a) about 0.01 to 3.0 wt.%, based on solids, when the dispersed polyurethane has a non-ionic hydrophilic group content of 1.0 wt.% or less, and
 (b) about 0.01 to 0.4 wt.%, based on solids, when the dispersed polyurethane has a non-ionic hydrophilic group content greater than 1 wt.%,
wherein the dispersibility of the polyurethane is due to anionic groups, non-ionic hydrophilic groups, external emulsifiers or a combination thereof.

3. The process of claim 2 wherein between about 0.05 and 0.5 wt.% of an organic or inorganic salt containing

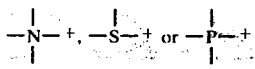

groups is utilized as component (a).

4. The process of claim 2 wherein between about 0.05 and 0.5 wt.% of the water soluble salt of a mineral acid is utilized as the organic or inorganic salt in component (a).

5. A stable aqueous dispersion which yields films having superior water resistance and/or blocking resistance comprising
 (a) polyurethane having a non-ionic hydrophilic group content of less than 1.0 wt.% based on solids;
 (b) sufficient anionic or non-ionic hydrophilic groups chemically incorporated into said polyurethane or sufficient external emulsifier to render said dispersion stable;
 (c) between about 0.01 and 3 wt.%, based on solids, of a water soluble organic or inorganic salt other than an external emulsifier; and
 (d) sufficient water to act as the continuous phase of said dispersion.

6. The dispersion of claim 5 wherein
 (a) the organic or inorganic salt is the salt of a mineral acid and an alkaline earth metal, and
 (b) the water content is between about 95 and 35 wt.%.

7. A stable aqueous dispersion which yields films having superior water resistance and/or blocking resistance comprising
 (a) a polyurethane having a non-ionic hydrophilic group content of greater than 1 wt.% based on solids;
 (b) sufficient anionic or non-ionic hydrophilic groups chemically incorporated into said polyurethane or sufficient external emulsifier to render said dispersion stable;
 (c) between 0.01 to 0.4 wt.%, based on solids, of a water soluble organic or inorganic salt other than an external emulsifier; and
 (d) about 35 to 95 wt.% water.

8. The dispersion of claim 7 wherein
 (a) said electrolyte is the salt of a mineral acid and an alkaline earth metal, and
 (b) the requirement of component (b) is met by providing sufficient anionic or non-ionic hydrophilic groups chemically incorporated into said polyurethane.

* * * * *